(12) United States Patent
Webering et al.

(10) Patent No.: US 11,064,716 B2
(45) Date of Patent: Jul. 20, 2021

(54) COMPOSITION FOR COATING FROZEN CONFECTIONERY AND A PROCESS FOR MANUFACTURING SAME

(71) Applicant: NESTEC S.A., Vevey (CH)

(72) Inventors: Christel Webering, York (GB); Olga Smirnova, York (GB); Shantha Nalur Chandrasekaran, Leeds (GB)

(73) Assignee: Societe des Produits Nestle S.A., Vevey (CH)

( * ) Notice: Subject to any disclaimer, the term of this patent is extended or adjusted under 35 U.S.C. 154(b) by 164 days.

(21) Appl. No.: 15/565,979

(22) PCT Filed: Apr. 12, 2016

(86) PCT No.: PCT/EP2016/057950
§ 371 (c)(1),
(2) Date: Oct. 12, 2017

(87) PCT Pub. No.: WO2016/166069
PCT Pub. Date: Oct. 20, 2016

(65) Prior Publication Data
US 2018/0092378 A1 Apr. 5, 2018

(30) Foreign Application Priority Data

Apr. 17, 2015 (EP) .................................. 15164105

(51) Int. Cl.
*A23G 9/32* (2006.01)
*A23G 9/34* (2006.01)

(52) U.S. Cl.
CPC ............... *A23G 9/322* (2013.01); *A23G 9/34* (2013.01); *A23G 9/32* (2013.01); *A23G 2200/06* (2013.01)

(58) Field of Classification Search
CPC . A23G 9/32; A23G 9/322; A23G 9/54; A23G 9/34; A23G 2200/06
USPC ........................................................ 426/660
See application file for complete search history.

(56) References Cited

U.S. PATENT DOCUMENTS

| 2,191,352 A * | 2/1940 | Sabin ................. A23G 9/322 |
| | | 426/91 |
| 2,207,034 A | 7/1940 | Vogel et al. |
| 2007/0237860 A1 | 10/2007 | Abu-Ali et al. |
| 2008/0131564 A1 * | 6/2008 | Nalur ..................... A23G 1/305 |
| | | 426/93 |
| 2012/0034366 A1 * | 2/2012 | Hoffman ................ A23L 29/30 |
| | | 426/548 |

FOREIGN PATENT DOCUMENTS

| CN | 101288434 A | 10/2008 | |
| EP | 0929690 | 12/2001 | |
| EP | 2025241 | 2/2009 | |
| WO | WO-2008064962 A1 * | 6/2008 | ............ A23G 1/305 |
| WO | 2014158777 A1 | 10/2014 | |

OTHER PUBLICATIONS

Hull, Peter "Glucose Syrups: Technology and Applications—Chapter 3—Glucose Syrup Manufacture" Feb. 25, 2010, John Wiley & Sons, 108 pages, XP002744714.
Souci et al. "Food Composition and Nutrition Tables" Medpharm Scientific Publishers, Stuttgart, Germany, Jan. 2000, pp. 1-71, XP002468783.
Kenyon et al. "Maltodextrins and Low-Dextrose-Equivalence Corn Syrup Solids" Flavor Encapsulation, American Chemical Society, Washington, DC, May 31, 1988, vol. 370, pp. 7-11, XP055214416.
Igoe et al., "Dictionary of Food Ingredients", Springer, Jan. 1, 2011, p. 40, XP055586698.

* cited by examiner

*Primary Examiner* — Jyoti Chawla
(74) *Attorney, Agent, or Firm* — K&L Gates LLP

(57) ABSTRACT

The invention relates to a composition for coating a frozen confection, the composition comprising 10 to 50 wt. % dry glucose syrup with a DE (Dextrose Equivalent) below 40, and a total amount of mono and di-saccharides below 10 wt. %, and a water activity below 1.0 and 35 to 70 wt. % fat. The invention also relates to a process for making the composition.

15 Claims, No Drawings

COMPOSITION FOR COATING FROZEN CONFECTIONERY AND A PROCESS FOR MANUFACTURING SAME

CROSS REFERENCE TO RELATED APPLICATIONS

The present application is a National Stage of International Application No. PCT/EP2016/057950, filed on Apr. 12, 2016, which claims priority to European Patent Application No. 15164105.7, filed on Apr. 17, 2015, the entire contents of which are being incorporated herein by reference.

FIELD OF THE INVENTION

The present invention relates to a composition for coating a frozen confection, in particular to a coating composition having low sugar content. The invention also relates to a method for manufacturing the same.

BACKGROUND

Coated frozen confections are products which are highly appreciated by consumers. Sweetness is a major driver for consumer preference. Another important feature is the texture of the coating.

With the increasing concern for health and wellness there is an increasing need for reducing calories, sugars and fats also in frozen confections. Nutritionists recommend consumers to decrease added sugar intake and favour consumption of unrefined carbohydrates, especially in children diets.

Many frozen confections have been put on the market that claim low or no sugar by containing polyols and/or intense sweeteners. However, polyols are suspected to have laxative effects when consumed at high levels and use of intense sweeteners does not have a good image for consumers and in particular for products aimed at young children.

It is common knowledge that sugars play an essential role in the sensory properties of frozen confections. Sugars have at least a dual function in frozen confections. They provide sweetness and flavour enhancement and depress the freezing point making the frozen confection palatable, they also contribute to the texture of the coating.

It is generally known that low quantities of sugars (mono and di saccharides) in frozen confections will lead to a reduction in sweetness, flavour and increased hardness, with a risk of mouth "burning" sensation. For ice cream scooping of the product becomes harder with lower levels of sugar.

All sugars do not have the same sweetening power and freezing point depression factor. Usually, mono-saccharides such as glucose, galactose or fructose depress the freezing point more than di-saccharides like maltose, lactose, sucrose.

In the present context the term "sugars" in this document will be defined as a mixture of mono- and di-saccharides. For example, sucrose, glucose, fructose, maltose are sugars according to this definition. Moreover, the term "sugar" will be defined as sucrose, or common sugar.

Chocolate-like or compound coatings based on fats are commonly used for coating frozen confection. The physical properties of the coating, in particular its bite properties and setting time, are determined by the crystallization of the fat. Traditionally compound coatings for frozen confection have been manufactured with coconut oil which has a saturated fat acid (SFA) level of 91%. With high amounts of fats in the coatings the SFA levels are typically above 50%.

Also regarding fats the consumers are looking for products which are healthier but provide the same properties to the product. Solutions to this problem exist in the form of coatings blends comprising particular liquid oils which are lower in SFA and fractions of palm oil. The viscosity of these blends is key to achieving the SFA reduction because too thick a coating will result in more fat in the coating and consequently a bigger quantity of SFA.

It is therefore desirable to have certain limit of added sugar, fat and saturated fat acids to frozen confection. Examples of such limits per portion are e.g.: 150 kcal, fat: 9 g, sat. fat: 7 g. Particular targets for kids products are 110 kcal or less per portion.

Most straightforward solution to reduce the amount of sugar is to simply reduce the amount of sugar mixed in the coating preparation. However this would also reduce the amount of total solid and affect properties of the coating. Due to the high fat content such a coating would have a very low, almost water like, viscosity causing only very thin layer of coating.

Common solution to balance this reduction in total solid is to use a bulking agent, for example sugars (fructose), Polyols (erythritol, sorbitol), fibers (Promitor™), and salts. Unfortunately these bulking agents can be undesirable for several reasons: too expensive, bad perception from the consumer (clean label), undesirable digestive trouble, metallic or bitter aftertaste.

Glucose syrup could be considered as a bulking agent overcoming most of these issues. Used in an aqueous suspension, the resulting coating would be rather a soft, Ganache-type. Dried glucose syrups are however known to be hydroscopic. This hygroscopicity would affect both the coating manufacturing process and the coating application. Men skilled in the art would void glucose syrup when it comes to liquid coating formulations due to difficult handling.

Common bulking agents like fibres would reduce the sensory properties of the coating (less "sugary" sweet or metallic aftertaste). Finally, sugar replacement by a bulking agent will influence the application properties of the coating solution. When liquid (coating bath) the melting temperature and viscosity could be modified; when solid (hard coating layer around the frozen product) the snap could be modified. There is no teaching in the prior art of what would be an optimal solution for including fibers in the coating.

There is therefore a need to reduce the amount of sugar in a frozen confection coating while keeping the physical characteristics of said coating, e.g. snap, mouth feel, melting behavior, no grittiness, sweetness perception, and avoid undesirable aftertastes.

Furthermore there is a need to have confectionary coatings where the physical attributes of the coating meet the requirements of the operational parameters, e.g. dripping and setting time, pick-up weight, plastic viscosity, yield value without impact on coating breakage or cracks.

Furthermore, there is a need for a reduced amount of both sugar and SFA in a frozen confectionery coating while maintaining the properties discussed above.

OBJECT OF THE INVENTION

It is thus the object of the present invention to provide a frozen confectionery product with a sugar reduced coating, said coating having physical properties acceptable for the consumers.

A second object the present invention is to provide a coating composition for frozen confectionery with acceptable processing characteristics.

A third object of the present invention is to provide a sugar reduced and SFA reduced coating composition for frozen confectionery.

SUMMARY OF THE INVENTION

It has surprisingly been found that a certain type of dry glucose syrup can be used as a bulking agent in ice cream coating and thus reduce the amount of sugar without modifying the physical properties of said coating, and moreover without increasing the viscosity of the coating bath.

According to a first aspect the present invention relates to a composition for coating a frozen confection, the composition comprising
- 10 to 50 wt. % dry glucose syrup with a DE (Dextrose Equivalent) below 40, and with a total amount of mono and di-saccharides below 10 wt. %, and a water activity below 1.0 (preferably below 0.6), and
- 35 to 70 wt. % fat.

It has been found that the coating according to the invention meet the requirements of the operational parameters (dripping & setting time, pick-up weight, plastic viscosity, yield value) without impact on coating breakage or cracks.

DETAILED DESCRIPTION OF THE INVENTION

In the present context the term "sugars" in this document will be defined as a mixture of mono- and di-saccharides. For example, sucrose, glucose, fructose, maltose are sugars according to this definition. Moreover, the term "sugar" will be defined as sucrose, or common sugar.

It has been found that with a composition for coating a frozen confection, wherein said composition comprises
- 10 to 50 wt. % dry glucose syrup with a DE (Dextrose Equivalent) below 40, and
- with a total amount of mono and di-saccharides below 10 wt. %, and a water activity below 1.0, preferably below 0.6, and
- 35 to 70 wt. % fat, it is possible to obtain a coating meeting the requirements of the operational parameters without impact on coating breakage or cracks, and having a reduced the amount of sugar while keeping the physical characteristics of said coating.

Surprisingly, it has been observed that dry glucose syrup with a mono and di-saccharides content below 10% (% in weight) have a low hydroscopic behaviour. By "low hydroscopic" is meant a product having a limited tendency to absorb water from its surrounding environment.

During the manufacturing the coating, a hydroscopic dry glucose syrup would pick up any ambient humidity and increase the viscosity of the coating (especially yield value). Furthermore the water activity of the thus produced coating would be higher, which would make it prone to microbiological activity and therefore having a shorter shelf life. During the coating application the coating would further increase in viscosity and thus the coating step would be difficult to control. Caking issues should also be mentioned.

By "dry" glucose syrup is meant glucose syrup containing less than 5% water.

Dry glucose syrup according to the present invention may preferably have a DE comprised from 20 to 40, more preferably from 25 to 40, even more preferably from 30 to 35. Dry glucose syrup with the DE value indicated is commercially available from e.g. ingredient suppliers Tate & Lyle or Tereos.

By "water activity" is meant the partial vapor pressure of water in a substance divided by the partial vapor pressure of pure water at the same temperature. Using this particular definition, pure distilled water has a water activity of exactly one. Higher water activity substances tend to support more microorganisms. Bacteria usually require at least 0.91, and fungi at least 0.7.

In a preferred embodiment the dry glucose syrup according to the present invention:
- the dry glucose syrup does not contain any polyols, for example mannitol or sorbitol, and/or
- the dry glucose syrup comprises less than 5% dextrose, preferably below 3% and/or
- the dry glucose syrup comprises less than 8% maltose.

In a preferred embodiment of the invention, the composition additional comprises below 25 wt. % sugars, preferably 5 to 22 wt. %.

According to a particular embodiment of the present invention, said sugars are selected from the group consisting of sucrose, glucose, fructose, maltose or a combination thereof.

Furthermore, when considering a composition containing said sugars, the dry glucose syrup may be present in an amount of 10 to 30 wt. %.

Advantageously the dry glucose syrup according to the present invention may therefore replace a portion of the sugar in order to obtain a sugar reduced coating composition.

In another embodiment, the present invention is drawn to compositions wherein the dry glucose syrup is present in an amount of 15 to 50 wt. %.

In a particular embodiment the dry glucose syrup according to the invention may replace all the sources of sugar (sucrose). In other word, the ice cream coating thus obtained contains no other ingredient than the dry glucose syrup for sweetening the composition.

In a preferred embodiment, the composition according to the present invention contains fat, wherein said fat has a saturated fat level (SFA) below 60%.

The composition according to the present invention may be combined with known techniques to reduce the fat and SFA (saturated fatty acid) content of chocolate containing coating: EP2099313 (Nestec), and EP2367441 (Unilever). These patents neither address the problem of reducing the amount of sugar in the coating nor suggest the use of dry glucose syrup in a coating formulation.

Fat and sugars are homogeneously mixed within the composition for coating a frozen confection. Solidification step of said composition is related to the crystallization of fat molecules. Crystallization of fat molecules will be influenced by the presence of other molecules, and any modification in the composition may have an influence on this crystallization/solidification step. Texture (SNAP, or brittleness) of the coating of a frozen confection may be considered as a driver for consumer preference, therefore it is important to maintain this characteristic.

Suitable fats for the composition according to the present invention may be selected from the group consisting of: coconut oil, palmkernel oil, palm oil, palm oil fractions, sunflower oil, olive oil, soybean oil, rapeseed oil, corn oil, cottonseed oil, groundnut oil, shea oil, mango kernel oil, or combination thereof. Preferably the fats are selected from the group consisting of: palm oil mid fraction, sunflower oil, rapeseed oil or a combination thereof.

In a preferred embodiment, the composition of the invention contains fat comprising
- from 8 to 15 wt. % liquid oil, and
- 20 to 62 wt. % palm oil mid fraction, the weight being based on the total weight of the composition.

Preferred liquid oil according to the composition of the present invention are sunflower oil, olive oil, soybean oil, rapeseed oil, corn oil, cottonseed oil, groundnut oil, or a combination thereof.

In one particular preferred embodiment of the invention, the liquid oil is sunflower oil.

In another particular preferred embodiment of the invention, the liquid oil rapeseed oil.

Both sunflower and rapeseed oils are particularly suitable in the scope of the present invention because they have a low SFA content, no off flavour and are reasonably priced.

According to the present invention, the composition may comprise 0.1 to 2 wt. % of emulsifiers selected from sunflower lecithin, soya lecithin polyglycerol polyricinoleate (PGPR; E476), ammonium phosphatide (YN; E442) or a combination thereof.

According to another embodiment, the composition of the present invention may further comprise from 5 to 25 wt. % cocoa solids non-fat.

Below 5% the taste of cocoa will not be strong enough to be perceived by consumers as cocoa flavour, more than 25% is usually not suitable due to a very strong and bitter taste.

Furthermore, the composition according to the present invention may in a preferred embodiment comprise from 1 to 20 wt. % non-fat milk solids. Below 1% non-fat milk solids, the color, flavour and texture of the composition is not satisfactory from a sensory point of view. Above 20% non-fat milk solids, no additional benefit is achieved.

In another embodiment the invention relates to a process for producing a coating composition as described above, said process comprising the steps:
- blending the dry glucose syrup in the liquid oil,
- adding the remaining ingredients to the blend, and afterwards
- grinding the blend to obtain the composition.

In a further embodiment the invention relates to a process for producing a coating composition as described above, said process comprising the steps:
- mixing the dry glucose syrup with the other dry ingredients of the composition,
- blending the dry mixed ingredients in the oil, and afterwards
- grinding the blend to obtain the composition.

It is important to immerge the glucose syrup in oil before grinding. If the ingredients are all dry refined, amorphous structures are created, which are prone to pick up moisture (hygroscopic). This would negatively impact the viscosity of the coating composition.

The invention also relates to a process for producing a coated frozen confection, the process comprising providing a coating composition according to the present invention and coating a frozen composition.

In a preferred embodiment, the invention relates to a frozen confection coated with a composition according to the present invention.

Preferably, the frozen confection according to the present invention may have a coating thickness from 0.5 to 5 mm.

Furthermore, the frozen confection according to the present invention may be ice cream.

EXAMPLES

By way of example and not limitation, the following examples are illustrative of various embodiments of the present disclosure.

Recipe and Preparation:

Preparation of the Product

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Coating samples have been made by mixing the dry ingredients, the oils and emulsifiers (lechitin only) to obtain 1.8 kg batch. After mixing, the composition is ground in a mill (Royal Duyvis Wiener 1-W-S; 8 mm steel balls) at 45° C., for 18 minutes. When grinding is over, other emulsifiers (PGPR), coloring and flavoring agent are added to the composition and stirred at 150 rpm for 30 minutes.

Example 1

Example 1 discloses two coating formulations according to the present invention and one reference (Table 1). Purpose of this example is to demonstrate the processability the composition according to the invention when a high fat content is used, about 62% of the total coating composition in this example. Applicability of the invention to low SFA composition is also demonstrated.

Compositions

TABLE 1

| Reduced sugar coating compositions, weight in % | | | |
|---|---|---|---|
| | A-0 (Reference) | A-1 | A-2 |
| Sugar | 37.40 | 18.70 | 18.70 |
| Dry Glucose Syrup DE 30-34 | — | 18.70 | 18.70 |
| Coconut Oil | 47.60 | 47.60 | — |
| Palm Oil Mid Fraction | — | — | 49.28 |
| Palm Olein | 14.00 | 14.00 | — |
| Sunflower Oil | — | — | 12.32 |
| Coloring & Flavoring | 0.50 | 0.50 | 0.50 |
| Sunflower Lecithin | 0.50 | 0.50 | 0.50 |
| Total | 100 | 100 | 100 |

Sample A-0 is a reference of a typical coating composition. This sample is outside the scope of the present invention.

Sample A-1 discloses a 50% replacement of sugar by dry glucose syrup. Fat content is 62% (Sunflower Lechitin 0.47% of fat), SFA content is 51.5%.

Sample A-2 discloses a 50% replacement of sugar by dry glucose syrup in a SFA reduced composition. Fat content is 61.6%, SFA content is 31.76%

All the samples have comparable viscosity. Plastic viscosity of A-0 and A-1 is the same.

A-2 plastic viscosity is slightly above A-0. Sweetness perception for samples A-1 and A-2 is slightly lower than for A-0, but remains acceptable from a sensory perspective. All these samples are suitable for any standard coating process.

Example 2

Example 2 discloses two coating formulations according to the present invention and one reference (Table 2). Purpose of this example is to demonstrate the processability the composition according to the invention when a low fat content is used, about 40% of the total coating composition in this example. Furthermore, Example 2 samples include cocoa powder to demonstrate the validity of the invention in the field of cocoa coating. Applicability of the invention to low SFA composition is also demonstrated.

Compositions

TABLE 2

Reduced sugar, cocoa coating compositions, weight in %

|  | B-0 (Reference) | B-1 | B-2 |
|---|---|---|---|
| Sugar | 46.50 | 23.25 | 23.25 |
| Dry Glucose Syrup DE 30-34 | — | 23.25 | 23.25 |
| Coconut Oil | 38.00 | 38.00 | — |
| Palm Oil Mid Fraction | — | — | 32.00 |
| Sunflower Oil | — | — | 5.20 |
| Cocoa Powder | 15.00 | 15.00 | 15.00 |
| Sunflower Lecithin | 0.50 | 0.50 | 0.50 |
| PGPR | — | — | 0.80 |
| Total | 100 | 100 | 100 |

Sample B-0 is a reference of a typical cocoa coating composition. This sample is outside the scope of the present invention.

Sample B-1 discloses a 50% replacement of sugar by dry glucose syrup in a cocoa composition. Fat content is 40%, SFA content is 37%.

Sample B-2 discloses a 50% replacement of sugar by dry glucose syrup in a cocoa, SFA reduced, composition. Fat content is 40%, SFA content is 22%.

Plastic viscosity of B-0 and B-1 is the same. B-2 plastic viscosity is lower than B-0 because of addition of PGPR. Sweetness perception for samples B-1 and B-2 is comparable to B-0. All these samples are suitable for any standard coating process.

Example 3

Example 3 discloses one coating formulations according to the present invention and one reference (Table 3). Purpose of this example is to demonstrate the processability the composition according to the invention when sugar is fully replaced by dry glucose syrup.

Compositions

TABLE 3

Non-sugar, cocoa coating composition, weight in %

|  | B-0 (Reference) | B-3 |
|---|---|---|
| Sugar | 46.50 | — |
| Dry Glucose Syrup DE 30-34 | — | 46.50 |
| Coconut Oil | 38.00 | 38.00 |
| Cocoa Powder | 15.00 | 15.00 |
| Sunflower Lecithin | 0.50 | 0.50 |
| Total | 100 | 100 |

Sample B-0 is a reference of a typical cocoa coating composition. This sample is outside the scope of the present invention.

Sample B-3 discloses a 100% replacement of sugar by dry glucose syrup. Fat content is 40%, SFA content is 37%.

Plastic viscosity of B-0 and B-3 is the same. Sweetness perception for sample B-3 is slightly lower than for B-0. B-3 sample is suitable for any standard coating process.

Example 4

Example 4 discloses a comparative sample and a reference (Table 4). Purpose of this example is to demonstrate that any type of glucose syrup would not enable processability of the composition according to the invention.

Compositions

TABLE 4

Comparative example of a non-sugar, cocoa coating composition, weight in %

|  | B-0 (Reference) | B-4 (Comparative) |
|---|---|---|
| Sugar | 46.50 | — |
| Dry Glucose Syrup DE 29 | — | 46.50 |
| Coconut Oil | 38.00 | 38.00 |
| Cocoa Powder | 15.00 | 15.00 |
| Sunflower Lecithin | 0.50 | 0.50 |
| Total | 100 | 100 |

Sample B-0 is a reference of a typical cocoa coating composition. This sample is outside the scope of the present invention.

Sample B-4 discloses a 100% replacement of sugar by dry glucose syrup which is outside the scope of the present invention (total mono and di saccharide content is above 10%, in the present sample 16%).

Plastic viscosity of B-4 is higher than B-0. Sweetness perception for sample B-4 is significantly lower than for B-0. B-4 sample is not suitable for any standard coating process.

The invention claimed is:
1. A composition for coating a frozen confection, the composition comprising:
   10 to 50 wt. % dry glucose syrup with a DE (Dextrose Equivalent) from 25 to 40, a total amount of mono and di-saccharides below 10 wt. %, and a water activity below 1.0; and
   35 to 70 wt. % fat.
2. The composition according to claim 1, wherein the composition comprises below 25 wt. % sugars.

3. The composition according to claim 2, wherein the sugars are selected from the group consisting of sucrose, glucose, fructose, maltose and combinations thereof.

4. The composition according to claim 1, wherein the dry glucose syrup is present in an amount of 10 to 30 wt. %.

5. The composition according to claim 1, wherein the dry glucose syrup is present in an amount of 15 to 50 wt. %.

6. The composition according to claim 1, wherein the fat has a saturated fat level (SFA) below 60%.

7. The composition according to claim 1, wherein the fat comprises from 8 to 15 wt. % liquid oil and 20 to 62 wt. % palm oil mid fraction based on the total weight of the composition.

8. The composition according to claim 7, wherein the liquid oil is selected from the group consisting of sunflower oil, olive oil, soybean oil, rapeseed oil, corn oil, cottonseed oil, groundnut oil, and combinations thereof.

9. The composition according to claim 7, wherein the liquid oil is sunflower oil.

10. The composition according to claim 1, wherein the composition comprises 0.1 to 2 wt. % of emulsifiers selected from the group consisting of sunflower lecithin, soya lecithin polyglycerol polyricinoleate, ammonium phosphatide and combinations thereof.

11. The composition according to claim 1 comprising from 5 to 25 wt. % cocoa solids.

12. The composition according to claim 1 comprising from 1 to 20 wt. % non-fat milk solids.

13. The composition according to claim 1, wherein the composition comprises 18.70 to 46.50 wt. % of the dry glucose syrup, and the DE is from 30 to 34.

14. The composition according to claim 1, wherein the composition comprises 18.70 to 46.50 wt. % of the dry glucose syrup, the DE is from 30 to 34, and the composition comprises no fractioned palm oil.

15. The composition according to claim 1, wherein the dry glucose syrup has a DE from 30 to 35.

* * * * *